(12) United States Patent
Jin et al.

(10) Patent No.: US 10,288,050 B2
(45) Date of Patent: May 14, 2019

(54) LIQUID CRYSTAL PUMP AND METHOD FOR EJECTING LIQUID CRYSTAL USING THE SAME

(71) Applicants: BOE TECHNOLOGY GROUP CO., LTD., Beijing (CN); BEIJING BOE DISPLAY TECHNOLOGY CO., LTD., Beijing (CN)

(72) Inventors: Tengchao Jin, Beijing (CN); Liang Hu, Beijing (CN); Xiaoqiang Zeng, Beijing (CN); Liang Ma, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 444 days.

(21) Appl. No.: 14/801,260

(22) Filed: Jul. 16, 2015

(65) Prior Publication Data

US 2016/0161773 A1 Jun. 9, 2016

(30) Foreign Application Priority Data

Dec. 5, 2014 (CN) .......................... 2014 1 0742064

(51) Int. Cl.
*F04B 7/04* (2006.01)
*F04B 7/06* (2006.01)
(Continued)

(52) U.S. Cl.
CPC ................ *F04B 7/04* (2013.01); *F04B 7/06* (2013.01); *F04B 13/00* (2013.01); *F04B 19/22* (2013.01);
(Continued)

(58) Field of Classification Search
CPC .......... F04B 7/04; F04B 7/06; F04B 39/0005; F04B 13/00; F04B 19/22; F04B 23/02;
(Continued)

(56) References Cited

U.S. PATENT DOCUMENTS 1,099,155 A * 6/1914 Ahlborn .................... F04B 7/06
417/492
3,168,872 A * 2/1965 Pinkerton ................. F04B 7/06
417/492
(Continued)

FOREIGN PATENT DOCUMENTS

CN          1576978 A      2/2005
CN        102059198     * 11/2010
(Continued)

OTHER PUBLICATIONS

First Office Action regarding Chinese application No. 201410742064. 9, dated Sep. 21, 2016. Translation provided by Dragon Intellectual Property Law Firm.

*Primary Examiner* — Alexander B Comley
*Assistant Examiner* — Benjamin Doyle
(74) *Attorney, Agent, or Firm* — Harness, Dickey & Pierce, P.L.C.

(57) ABSTRACT

The present disclosure relates to a liquid crystal (LC) display field and discloses an LC pump. The LC pump may include a case; a second linear container arranged within the case; and a nozzle arranged at the bottom of the case. The second linear container may include an LC delivery channel and at least two LC inlets. And LC may flow through the LC inlets and the LC delivery channel sequentially and then may be ejected from the nozzle.

17 Claims, 4 Drawing Sheets

(51) Int. Cl.
*F04B 13/00* (2006.01)
*F04B 19/22* (2006.01)
*F04B 53/14* (2006.01)
*G02F 1/13* (2006.01)
*G02F 1/1341* (2006.01)

(52) U.S. Cl.
CPC .......... *F04B 53/148* (2013.01); *G02F 1/1303* (2013.01); *G02F 1/1341* (2013.01)

(58) Field of Classification Search
CPC ..... F04B 23/025–23/028; F04B 53/148; F04B 53/16; G02F 1/1303; G02F 1/1341
USPC ................ 417/500, 501, 489–490, 493–494, 417/498–499, 503; 222/136, 372–373
See application file for complete search history.

(56) References Cited

U.S. PATENT DOCUMENTS

| | | | | | |
|---|---|---|---|---|---|
| 4,008,003 | A | * | 2/1977 | Pinkerton | F04B 5/02 137/99 |
| 5,015,157 | A | * | 5/1991 | Pinkerton | F04B 7/06 417/492 |
| 5,060,825 | A | * | 10/1991 | Palmer | A61C 1/0084 222/136 |
| 5,246,354 | A | * | 9/1993 | Pardinas | F04B 7/06 417/493 |
| 5,248,087 | A | * | 9/1993 | Dressler | B05B 17/0607 239/102.2 |
| 5,263,888 | A | * | 11/1993 | Ishihara | G02F 1/1341 349/190 |
| 5,312,233 | A | * | 5/1994 | Tanny | F04B 7/0038 417/316 |
| 5,406,989 | A | * | 4/1995 | Abe | G02F 1/1341 141/31 |
| 5,482,448 | A | * | 1/1996 | Atwater | F04B 7/06 417/492 |
| 5,526,745 | A | * | 6/1996 | Uera | B41F 31/08 101/366 |
| 5,875,922 | A | * | 3/1999 | Chastine | B05C 5/02 222/1 |
| 5,961,303 | A | * | 10/1999 | King | F04B 7/06 417/492 |
| 6,063,339 | A | * | 5/2000 | Tisone | B01J 19/0046 422/509 |
| 6,190,739 | B1 | * | 2/2001 | Hoffer | B05B 16/20 427/424 |
| 6,398,513 | B1 | * | 6/2002 | Amsler | G01F 11/021 222/333 |
| 6,739,478 | B2 | * | 5/2004 | Bach | B01L 3/0206 222/1 |
| 6,749,402 | B2 | * | 6/2004 | Hogan | B01F 13/1055 222/333 |
| 7,059,538 | B2 | * | 6/2006 | Maruyama | B05C 5/0225 239/102.2 |
| 7,125,520 | B2 | * | 10/2006 | Gaillard | B01L 3/0206 422/505 |
| 7,131,555 | B2 | * | 11/2006 | Maruyama | B05C 5/0225 222/1 |
| 7,207,780 | B2 | * | 4/2007 | Bach | B01L 3/0217 417/442 |
| 7,323,960 | B2 | * | 1/2008 | Maruyama | H01L 41/12 251/129.06 |
| 7,359,028 | B2 | * | 4/2008 | Makimoto | G02F 1/1333 349/198 |
| 7,384,485 | B2 | * | 6/2008 | Ryu | G02F 1/1341 118/665 |
| 7,419,548 | B2 | * | 9/2008 | Jeong | G02F 1/1341 118/300 |
| 7,470,447 | B2 | * | 12/2008 | Maruyama | F04B 13/00 427/427.1 |
| 7,520,967 | B2 | * | 4/2009 | Maruyama | B05C 5/02 204/212 |
| 7,647,883 | B2 | * | 1/2010 | Maruyama | B05C 5/02 118/300 |
| 7,678,212 | B2 | * | 3/2010 | Ryu | G02F 1/1341 156/64 |
| 7,798,783 | B2 | * | 9/2010 | Burns | F04B 7/06 310/12.14 |
| 8,187,228 | B2 | * | 5/2012 | Bikovsky | A61M 5/1413 604/131 |
| 8,702,405 | B2 | * | 4/2014 | Verrilli | F04B 3/00 417/461 |
| 9,057,363 | B2 | * | 6/2015 | Capone | F04B 7/00 |
| 9,095,650 | B2 | * | 8/2015 | Matsuura | A61M 5/14216 |
| 9,222,470 | B2 | * | 12/2015 | Genoud | A61M 5/14216 |
| 9,261,085 | B2 | * | 2/2016 | Middleton | F04B 13/00 |
| 9,314,812 | B2 | * | 4/2016 | Clark | B05C 5/0225 |
| 9,726,172 | B2 | * | 8/2017 | Wattellier | F04C 13/001 |
| 9,919,336 | B2 | * | 3/2018 | Ikushima | B05C 5/0225 |
| 2001/0043864 | A1 | * | 11/2001 | Maruyama | F04B 7/06 417/44.1 |
| 2002/0062787 | A1 | * | 5/2002 | Hashizume | B32B 38/1841 118/664 |
| 2003/0000965 | A1 | * | 1/2003 | Bach | B01L 3/0206 222/135 |
| 2003/0104634 | A1 | * | 6/2003 | Jacobs | B01L 3/0289 436/180 |
| 2004/0011422 | A1 | * | 1/2004 | Ryu | B05C 11/10 141/95 |
| 2004/0081759 | A1 | * | 4/2004 | Maruyama | B05C 5/0216 427/256 |
| 2004/0228970 | A1 | * | 11/2004 | Maruyama | F04B 13/00 427/256 |
| 2004/0241023 | A1 | * | 12/2004 | Pinkerton, III | F04B 7/06 417/461 |
| 2004/0265479 | A1 | * | 12/2004 | Jeong | G02F 1/1341 427/64 |
| 2005/0173463 | A1 | * | 8/2005 | Wesner | F04B 7/06 222/383.2 |
| 2005/0276705 | A1 | * | 12/2005 | Pinkerton, III | F04B 7/06 417/415 |
| 2006/0102877 | A1 | * | 5/2006 | Kim | G02F 1/1341 252/299.01 |
| 2008/0310969 | A1 | * | 12/2008 | Hogan | B01F 5/12 417/53 |
| 2011/0002802 | A1 | * | 1/2011 | Capone | F04B 7/00 417/486 |
| 2012/0135663 | A1 | | 5/2012 | Yi | |
| 2016/0161773 | A1 | * | 6/2016 | Jin | G02F 1/1303 428/411.1 |

FOREIGN PATENT DOCUMENTS

| | | |
|---|---|---|
| CN | 102059198 A | 5/2011 |
| CN | 202591055 | * 12/2012 |
| CN | 202591055 U | 12/2012 |
| CN | 202600315 U | 12/2012 |
| CN | 203973812 U | 12/2014 |

* cited by examiner

LIQUID CRYSTAL PUMP AND METHOD FOR EJECTING LIQUID CRYSTAL USING THE SAME

CROSS-REFERENCE TO RELATED APPLICATION

The present application claims a priority of the Chinese patent application No. 201410742064.9 filed in China on Dec. 5, 2014, which is incorporated herein by reference in its entirety.

TECHNICAL FIELD

The present disclosure relates to a liquid crystal (LC) display field, more particular to an LC pump and a method for ejecting LC using the same, which can improve production efficiency and quality.

BACKGROUND

A liquid crystal (LC) dispenser is one of most important devices in field of thin film transistor-liquid crystal display (TFT-LCD). A coating process realized by the LC dispenser is a key to the success of production, in which an LC pump is a core element of the LC dispenser. The LC is coated on a liquid crystal display (LCD) panel by a specified manner, which is provided by an LC accommodation bottle using the LC pump.

FIGS. 1-2 are diagrams for illustrating a conventional LC pump. As shown in FIGS. 1-2, the LC pump includes: a case 1, a cap 2, a piston 3, a nozzle 4 and a first linear container 5. Herein the nozzle 4 is arranged at the bottom of the case 1. Both the first linear container 5 and the cap 2 are arranged within the case 1. And the cap 2 is also arranged on the first linear container 5. Specifically the first linear container 5 includes an LC inlet 9, an LC delivery channel 7 and an LC outlet 8. The LC delivery channel is provided with a pressure chamber therein, in which the piston 3 is provided. When the piston 3 moves, the LC can enter into the linear container via the LC inlet 9 within the first linear container 5, and then arrive at the nozzle 4 via the LC outlet 8, so as to complete a process for ejecting the LC. Specifically the processing for ejecting the LC can be divided into four steps, including: (1) an LC absorbing step: aligning a piston opening 13 with an LC outlet 9 and the piston moves upwards, i.e., an LC inflow phase; (2) an LC exchange step: the piston rotates by 180 degrees, i.e., aligning the piston opening 13 with the LC outlet 8; (3) an LC outflow step: the piston moves downwards, i.e., an LC outflow phase; and (4) an LC restoration step: the piston continues to rotate by 180 degrees and goes back to its original position. The whole process is repeated, so as to complete the process for ejecting the LC.

There is provided only one LC inlet 9 in the conventional LC pump, and only one LC pump can be connected with one LC accommodation bottle. Due to limitations resulted from the LC accommodation bottle itself in a production line, volume of the LC accommodation bottle cannot be very bulky, which results in a constant replacement after running out of LC inside the bottle. Therefore, not only the production efficiency deteriorates, but also the LC pump has to be opened while a certain LC accommodation bottle is replaced, which results in undesired risks as foreign substance may be introduced during the production.

In consideration of the above defects, it is necessary to provide an LC pump to improve efficiency and quality during the production.

SUMMARY

Technical Problems to be Solved

One of objects of the present disclosure is to solve the following technical problems, including: there is provided only one LC inlet in the conventional LC pump, and only one LC pump can be connected with one LC accommodation bottle. Due to limitations resulted from the LC accommodation bottle itself in the production line, the volume of the LC accommodation bottle cannot be very bulky, which results in a constant replacement after running out of LC inside the bottle. Therefore, not only the production efficiency deteriorates, but also the LC pump has to be opened while a certain LC accommodation bottle is replaced, which results in undesired risks as foreign substance may be introduced during the production.

Technical Solutions

According to an aspect of the present disclosure, a liquid crystal (LC) pump is provided, which may include: a case; a second linear container arranged within the case; and a nozzle arranged at the bottom of the case. The second linear container may include an LC delivery channel and at least two LC inlets; and LC may flow through the LC inlets and the LC delivery channel sequentially and then is ejected from the nozzle.

Alternatively, the LC pump may further include: a piston arranged to extend in an axial direction within the LC delivery channel. And a piston opening may be provided on the piston; the piston may be movable in the axial direction of the LC delivery channel; and the piston opening may be rotatable around an axis of the LC delivery channel as the piston moves.

Alternatively, the second linear container may further include at least two inlet channels corresponding to the LC inlets in a one-to-one correspondence manner; and one end of the inlet channel may be connected with the corresponding LC inlet, and the other end of the inlet channel is connected with the LC delivery channel.

Alternatively, the second linear container may further include a first outlet channel; and the nozzle may be connected with the LC delivery channel via the first outlet channel.

Alternatively, the inlet channels and the first outlet channel may be provided along a circumference of the LC delivery channel evenly.

Alternatively, the LC inlets may include a first LC inlet, a second LC inlet and a third LC inlet; and the first LC inlet, the second LC inlet, the third LC inlet and the first outlet channel may be provided along the circumference of the LC delivery channel, and an intersection angle between any two adjacent ones among the first LC inlet, the second LC inlet, the third LC inlet and the first outlet channel may be 90 degrees.

Alternatively, the inlet channels may include a first inlet channel and a second inlet channel, and an intersection angle between any two adjacent ones among the first inlet channel, the second inlet channel and the first outlet channel may be 120 degrees.

Alternatively, both the first LC inlet and the third LC inlet may be connected with the first inlet channel; and the second LC inlet may be connected with the second inlet channel.

Alternatively, there may be provided two LC accommodation bottles connected with the first LC inlet, the second LC inlet and the third LC inlet, one of the LC accommodation bottles is for production and the other one is for backup.

Alternatively, there may be provided at least two nozzles, and each of the at least two nozzles is connected with the first outlet channel.

Alternatively, the LC pump may further include: at least two second outlet channels corresponding to the nozzles in a one-to-one correspondence manner. And one end of the second outlet channel may be connected with the corresponding nozzle, and the other end of the second outlet channel may be connected with the first outlet channel.

According to another aspect of the present disclosure, a method for ejecting liquid crystal (LC) with a LC pump is provided. The LC pump may include: a case; a second linear container arranged within the case; and a nozzle arranged at the bottom of the case. The second linear container may include an LC delivery channel and at least two LC inlets, and LC may flow through the LC inlets and the LC delivery channel sequentially and then may be ejected from the nozzle. The LC pump may further include: a piston arranged to extend in an axial direction within the LC delivery channel. A piston opening may be provided on the piston; the piston may be movable in the axial direction of the LC delivery channel; and the piston opening may be rotatable around an axis of the LC delivery channel as the piston moves. The method may include the following steps: aligning the piston opening with the LC inlet by rotating the piston around the axis of the LC delivery channel, so as to enable the LC to flow into the LC delivery channel from the LC inlets as the piston moves upwards; ejecting the LC from the LC delivery channel via the nozzle, as the piston rotates around the axis of the LC delivery channel and moves downwards; and continuing to rotate the piston, so as to repeat the above two steps of aligning and ejecting.

Alternatively, according to the above method, with respect to the first LC inlet, the piston opening is aligned with the first LC inlet and moves upwards; the piston rotates by 90 degrees in a clockwise direction, i.e., the piston moves downwards after the piston opening is aligned with the first outlet channel; and the piston rotates by 90 degrees in a counterclockwise direction to go back to its original position.

Alternatively, according to the above method, with respect to the second LC inlet, the piston opening is aligned with the second LC inlet and moves upwards; the piston rotates by 180 degrees in the clockwise direction, i.e., the piston moves downwards after the piston opening is aligned with the first outlet channel; and the piston rotates by 180 degrees in the counterclockwise direction to go back to its original position.

Alternatively, according to the above method, with respect to the third LC inlet, the piston opening is aligned with the third LC inlet and moves upwards; the piston rotates by 90 degrees in the counterclockwise direction, i.e., the piston moves downwards after the piston opening is aligned with the first outlet channel; and the piston rotates by 90 degrees in the clockwise direction to go back to its original position.

According to yet another aspect of the present disclosure, a liquid crystal display (LCD) panel, which includes liquid crystal coated thereon by the above method, is provided.

Advantageous Effects

The above technical solutions according to embodiments of the present disclosure can achieve the following technical effects. According to the present disclosure, a second linear container in the LC pump includes an LC delivery channel and at least two LC inlets, and the LC flows through the LC inlets and the LC delivery channel sequentially and then is ejected from the nozzle. Further, according to the present disclosure, there are provided a plurality of LC inlets within the LC pump. When being used for production, the plurality of LC inlets are connected with a plurality of LC accommodation bottles respectively, one of which is for production and the other ones of which are for backup. As a result, replacement frequency for supplementing running-out LC can be greatly reduced. And it is possible to realize the LC replacement process without any time latency in conjunction with other processes of the production. Therefore, not only the production efficiency can be improved greatly, but also the quality of an LCD panel can be improved. Accordingly, the resultant LCD panel has advantageous features, such as low-cost, easy-implementation, and high-reliability.

DESCRIPTION OF THE DRAWINGS

In order to illustrate the technical solutions of the present disclosure or the related art in a clearer manner, the drawings desired for the embodiments will be described briefly hereinafter. Obviously, the following drawings merely relate to some embodiments of the present disclosure, and based on these drawings, a person skilled in the art may obtain the other drawings without any creative effort.

DETAILED EMBODIMENTS

In the description of the present disclosure, unless indicated otherwise, "a plurality of" means two or more than two. Orientations or position relations indicated by terms like "on", "under", "left", "right", "in" and "out" are orientations or position relations shown in figures, which are only used for facilitating the understanding of the present disclosure, other than explicitly or implicitly indicating mechanisms or elements herein have to be manufactured and operated at a certain orientation. Therefore, these cannot be regarded as limitations to the present disclosure.

In the description of the present disclosure, it should be appreciated that, unless otherwise indicated or limited, terms like "arrange", "connect", and "couple" should be interpreted broadly. For example, the connection can be a constant connection, or a detachable connection, an integral connection. In addition, the connection can also be a mechanical connection, or an electrical connection. Moreover, the connection can also be a direct connection, or an indirect connection via an intermediate medium. A person skilled in the art can understand the specific meanings of these terms in the context of the present disclosure.

The below detailed description on some embodiments of the present disclosure will be given. A skilled person can appreciate that these embodiments are only used to illustrate the present disclosure, but not to limit the scope of the present disclosure.

In order to make the objects, the technical solutions and the advantages of the present disclosure more apparent, the present disclosure will be described hereinafter in a clear and complete manner in conjunction with the drawings and embodiments. Obviously, the following embodiments are merely a part of, rather than all of, the embodiments of the present disclosure, and based on these embodiments, a person skilled in the art may obtain the other embodiments, which also fall within the scope of the present disclosure.

Figure 1:
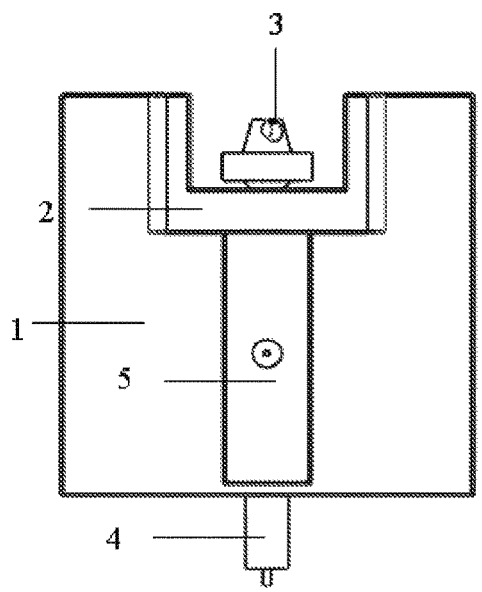
FIG. 1 illustrates a structure of a conventional liquid crystal (LC) pump according to the related art.
Figure 2:
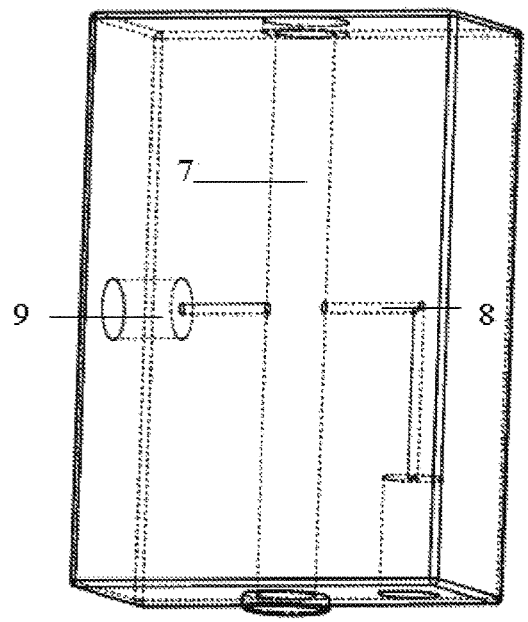
FIG. 2 illustrates a structure of a first linear container within the conventional LC pump according to the related art.
Figure 3:
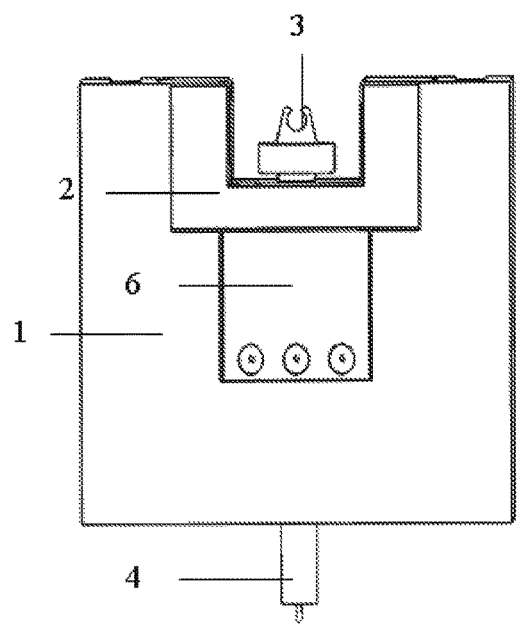
FIG. 3 illustrates a structure of an LC pump according to an embodiment of the present disclosure.
Figure 4:
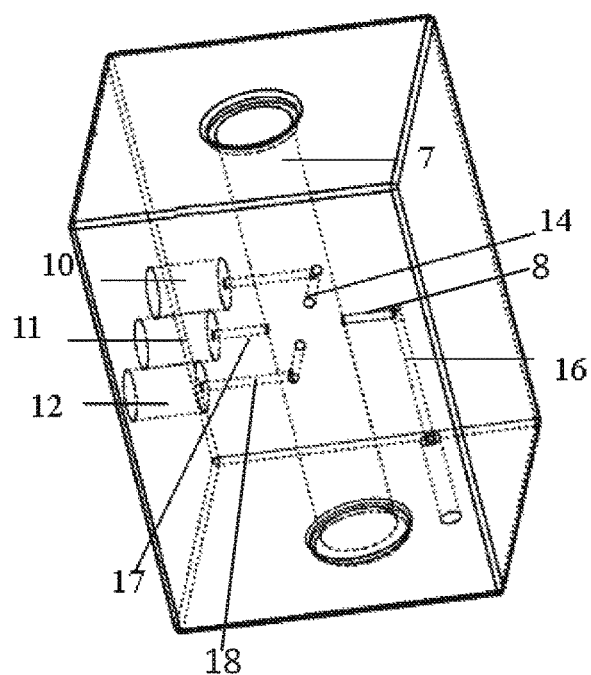
FIG. 4 illustrates a structure of a second linear container within the LC pump according to an embodiment of the present disclosure.
Figure 5:
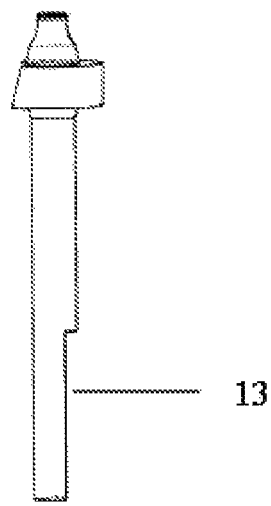
FIG. 5 illustrates a structure of a piston within the LC pump according to an embodiment of the present disclosure.

As shown in FIGS. 3-5, the liquid crystal (LC) pump according to an embodiment of the present disclosure includes: a case 1; a second linear container 6 arranged within the case 1; and a nozzle 4 arranged at the bottom of the case 1. The second linear container 6 includes an LC delivery channel 7 and at least two LC inlets. The second linear container 6, the LC delivery channel 7 and the nozzle 4 are connected sequentially, such that LC flows through the LC inlets and the LC delivery channel 7 sequentially and then is ejected from the nozzle 4.

According to the present disclosure, a second linear container 6 is provided with a plurality of LC inlets, which are connected with an LC accommodation bottle respectively, such that the LC pump becomes a novel LC pump that has a plurality of LC inlets. When being used for production, the plurality of LC inlets may be connected with a plurality of LC accommodation bottles respectively, one of which is for production and the other ones of which are for backup. After one bottle of LC is running out, the running-out bottle can be automatically replaced by another bottle to continue the production, which results in that multiple LC bottles can be replaced at one time during the LC replacement process. Moreover, the LC replacement process for the backup LC accommodation bottles during other processes of the production is also achievable. Therefore it is possible to implement the LC replacement process without any time latency in conjunction with other processes of the production. Therefore, not only production efficiency can be improved greatly, but also the quality of a liquid crystal display (LCD) panel can be improved.

The LC pump according to this embodiment of the present disclosure may further include a piston 3, on which a piston opening 13 is provided. Besides, the LC pump may further include a cap 2 within the case 1, which is also provided on the second linear container 6. The piston 3 is movable in an axial direction of the LC delivery channel 7 of the second linear container 6 after moving through the case 2, so that the piston 3 is able to move in the axial direction of the LC delivery channel 7 and the piston opening 13 is rotatable around an axis of the LC delivery channel 7 as the piston 3 moves. The piston opening 13 drives LC upwards through an LC inlet(s) and the LC delivery channel 7 sequentially after aligning with an LC inlet(s). Thereafter the piston 3 is controlled by programs to rotate, such that the LC can be ejected from the nozzle 4 after aligning the piston opening 13 with an outlet channel of the nozzle 4.

In this embodiment of the present disclosure, the second linear container 6 may further include at least two inlet channels corresponding to the LC inlets in a one-to-one correspondence manner. One end of the inlet channel is connected with the corresponding LC inlet, and the other end of the inlet channel is connected with the LC delivery channel 7. In one embodiment, as shown in FIG. 4, the inlet channels include a first inlet channel 14, a second inlet channel 17 and a third inlet channel 18. The second linear container 6 may further include a first outlet channel 8; and the nozzle 4 is connected with the LC delivery channel 7 via the first outlet channel 8. The piston 3 is driven to rotate, such that LC can be ejected from the nozzle 4 after aligning the piston opening 13 with an outlet channel (i.e. a first outlet channel 8) of the nozzle 4.

Figure 6:
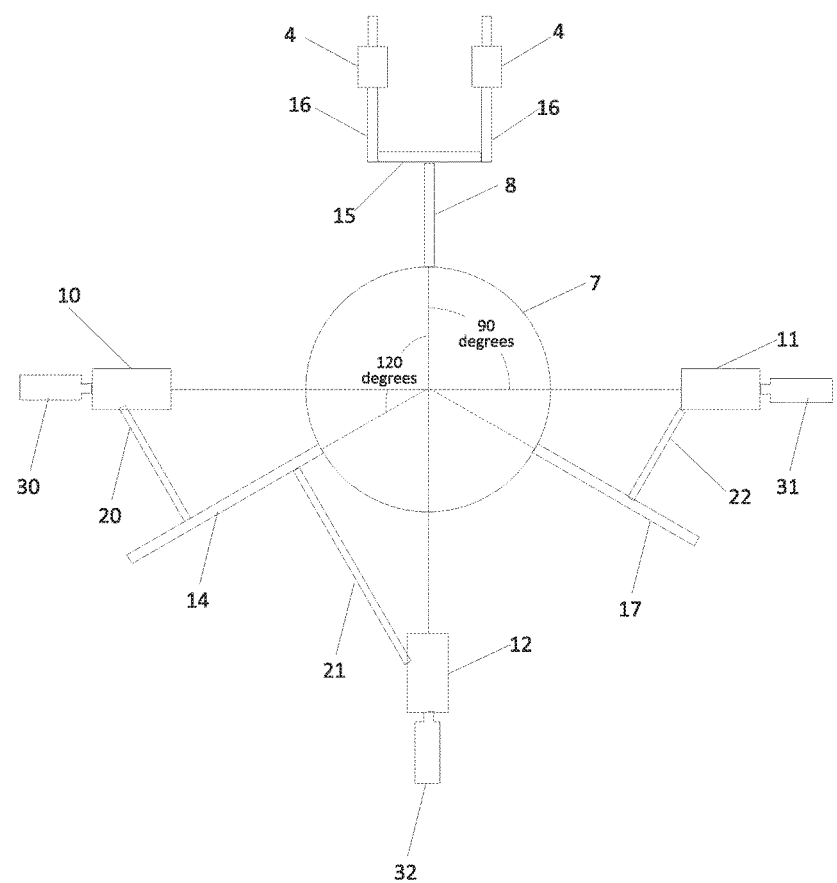
FIG. 6 is a schematic view showing connections within the second linear container and connections between the second linear container and other components of the LC pump according to an embodiment of the present disclosure.

In this embodiment of the present disclosure, the inlet channels and the first outlet channel 8 are provided along a circumference of the LC delivery channel 7 evenly, thereby distributing LC evenly. As shown in FIG. 6, when the LC inlets only include a first inlet channel 14 and a second inlet channel 17, the first inlet channel 14, the second inlet channel 17 and the first outlet channel 8 are provided along the circumference of the LC delivery channel 7 evenly, and an intersection angle between any two adjacent ones among these channels is 120 degrees.

In this embodiment of the present disclosure, within the LC pump, as shown in FIG. 6, when the LC inlets include a first LC inlet 10, a second LC inlet 11 and a third LC inlet 12, the first LC inlet 10, the second LC inlet 11, the third LC inlet 12 and the first outlet channel 8 are provided along the circumference of the LC delivery channel, and an intersection angle between any two adjacent ones among these channels is 90 degrees. The first LC inlet 10 and the third LC inlet 12 are connected with the first inlet channel 14 through respective first and second intermediate channels 20 and 21, and the second LC inlet 11 is connected with the second inlet channel 17 through a third intermediate channel 22. A first LC accommodation bottle 30 connected with the first LC inlet 10 is used for production, while a second LC accommodation bottle 31 and a third LC accommodation bottle 32 connected with the second LC inlet 11 and the third LC inlet 12 respectively are used for backup, so that it is possible to realize LC replacement process without any time latency in conjunction with other processes of the production. Therefore, not only production efficiency can be improved greatly, but also the quality of an LCD panel can be improved. Accordingly, the resultant LCD panel has advantageous features, such as low-cost, easy-implementation, and high-reliability.

In the LC pump according to this embodiment of the present disclosure, for reducing the time duration for ejecting LC, there are provided at least two nozzles 4, and each of the at least two nozzles 4 is connected with the first outlet channel 8. There are provided at least two nozzles 4 at the bottom of the case of the LC pump, and the nozzles 4 are connected with the LC delivery channel 7, so as to enable LC imported from the LC inlets to pass through the LC delivery channel 7 and then be ejected from the at least two nozzles 4. In contrast to the case of only one nozzle for ejecting LC in the conventional LC pump, in the embodiments of the present disclosure, the LC is rejected from the at least two nozzles 4, which results in that the capability of ejecting is at least doubled and the time duration for ejecting the LC is reduced. Thus, the ejecting efficiency is improved.

In this embodiment of the present disclosure, as shown in FIG. 6, there are further provided at least two second outlet channels 16 corresponding to the nozzles 4 in a one-to-one correspondence manner. Specifically, one end of the second outlet channel 16 is connected with the corresponding nozzle 4, and the other end of the second outlet channel 16 is connected with the first outlet channel 8. Each of the second outlet channels 16 is connected with the first outlet channel 8 via a second bypass channel 15. One end of the second outlet channel 16 is connected with an end of the second bypass channel 15; and the first outlet channel 8 is connected with the second bypass channel 15 at the middle of the second bypass channel 15. The LC passes through the first outlet channel 8 and the second bypass channel 15, and then enters into the second outlet channels 16 arranged at two ends of the second bypass channel 15 from the second bypass channel 15, thereafter is ejected from the nozzles 4 by passing through the second outlet channels 16. The second bypass channel 15 facilitates the LC to be ejected from the two outlet channels 16 more evenly.

The method for ejecting LC may include the following steps:

aligning the piston opening 13 with the LC inlet by rotating the piston 3 around the axis of the LC delivery channel 7, so as to enable the LC to flow into the LC delivery channel 7 from the LC inlets as the piston 3 moves upwards;

ejecting the LC from the LC delivery channel 7 via the nozzle 4, as the piston 3 rotates around the axis of the LC delivery channel 7 and moves downwards. Specifically, the piston opening 13 is aligned with the first outlet channel 8, the piston 3 moves downwards, and then the LC within the LC delivery channel 7 is ejected from the first outlet; and continuing to rotate the piston 3, so as to repeat the above two steps of aligning and ejecting. In other words, the piston opening 13 is driven to be aligned with the LC inlet as the piston 3 rotates an axis of the LC delivery channel 7 and returns to its original position.

Specifically, with respect to the first LC inlet 10, a specific process for ejecting LC includes: the piston opening 13 is aligned with the first LC inlet 10 and moves upwards, i.e., an LC inflow phase; the piston 3 rotates by 90 degrees in a clockwise direction, i.e., the piston 3 moves downwards after the piston opening 13 is aligned with the first outlet channel 8, i.e., an LC outflow phase; and finally the piston 3 rotates by 90 degrees in a counterclockwise direction to go back to its original position.

Specifically, with respect to the second LC inlet 11, a specific process for ejecting LC includes: the piston opening 13 is aligned with the second LC inlet 11 and moves upwards, i.e., an LC inflow phase; the piston 3 rotates by 180 degrees in the clockwise direction, i.e., the piston 3 moves downwards after the piston opening 13 is aligned with the first outlet channel 8, i.e., an LC outflow phase; and the piston 3 rotates by 180 degrees in the counterclockwise direction to go back to its original position.

Specifically, with respect to the third LC inlet 12, a specific process for ejecting LC includes: the piston opening 13 is aligned with the third LC inlet 12 and moves upwards, i.e., an LC inflow phase; the piston 3 rotates by 90 degrees in the counterclockwise direction, i.e., the piston 3 moves downwards after the piston opening 13 is aligned with the first outlet channel 8, i.e., an LC outflow phase; and the piston 3 rotates by 90 degrees in the clockwise direction to go back to its original position.

The above technical solutions according to embodiments of the present disclosure can achieve the following technical effects. According to the present disclosure, a second linear container in the LC pump includes an LC delivery channel and at least two LC inlets, and LC flows through the LC inlets and the LC delivery channel sequentially and then is ejected from the nozzle. Further, according to the present disclosure, there are provided a plurality of LC inlets within the LC pump. When being used for production, the plurality of LC inlets are connected with a plurality of LC accommodation bottles respectively, one of which is for production and the other ones of which are for backup. After one bottle of LC is running out, the running-out bottle can be automatically replaced by another bottle to continue the production, which results in that three LC bottles can be replaced at one time during the LC replacement process. Moreover, the LC replacement process for the backup LC accommodation bottles during other processes of the production is also achievable. As a result, replacement frequency for supplementing running-out LC can be greatly reduced. And it is possible to realize the LC replacement process without any time latency in conjunction with other processes of the production. Therefore, not only the production efficiency can be improved greatly, but also the quality of an LCD panel can be improved.

Furthermore, by arranging a plurality of nozzles, the LC is rejected from the at least two nozzles, which results in that the capability of ejecting is at least doubled and the time duration for ejecting the LC is reduced. Thus, the ejecting efficiency is improved.

Although the present disclosure is described with reference to several typical embodiments, it should be appreciated that the terms used are descriptive and illustrative, rather than limiting terms. Since the present disclosure can be specifically implemented in many forms without departing the spirit or essence of the invention, it shall be appreciated that the above embodiments are not limited to any aforesaid detail, but should be widely construed in the spirit and scope defined in the attached claims. Therefore, all changes and transformations falling into the scope of the claims or equivalent scope thereof shall be covered by the attached claims.

What is claimed is:

1. A liquid crystal (LC) pump, comprising: a case; at least three LC accommodation bottles; a linear container arranged within the case; and at least one nozzle arranged at a bottom of the case, wherein the linear container comprises an LC delivery channel, at least three LC inlets, a first outlet channel, and at least three inlet channels corresponding to the at least three LC inlets in a one-to-one correspondence manner; wherein LC flows through the at least three LC inlets and the LC delivery channel sequentially and then is ejected from the at least one nozzle, the at least three LC inlets comprise a first LC inlet, a second LC inlet and a third LC inlet, and the at least three inlet channels comprise a first inlet channel, a second inlet channel, and a third inlet channel; the first inlet channel, the second inlet channel and the third inlet channel correspond respectively to the first LC inlet, the second LC inlet, and the third LC inlet in the one-to-one correspondence manner; the at least three LC accommodation bottles comprises a first LC accommodation bottle, a second LC accommodation bottle, and a third LC accommodation bottle; the first LC accommodation bottle is connected with the first LC inlet, and in direct contact with an end of the first LC inlet; the second LC accommodation bottle is connected with the second LC inlet, and in direct contact with an end of the second LC inlet; the third LC accommodation bottle is connected with the third LC inlet, and in direct contact with an end of the third LC inlet; and the ends of the first, second and third LC inlets are arranged on a common plane which is coplanar with a surface of the linear container and perpendicular to an axial direction of the first, second and third LC inlets.

2. The LC pump according to claim 1, further comprising:
a piston arranged to extend in an axial direction within the LC delivery channel,
wherein a piston opening is provided on the piston;

the piston is movable in the axial direction of the LC delivery channel; and
the piston opening is rotatable around an axis of the LC delivery channel as the piston moves.

3. The LC pump according to claim 1, wherein
one end of each of the at least three inlet channels is connected with the corresponding LC inlet, and the other end of each of the at least three inlet channels is connected with the LC delivery channel.

4. The LC pump according to claim 3, wherein
the at least one nozzle is connected with the LC delivery channel via the first outlet channel.

5. The LC pump according to claim 4, wherein
the at least three inlet channels and the first outlet channel are provided along a circumference of the LC delivery channel evenly.

6. The LC pump according to claim 1, wherein
one of the first LC accommodation bottle, the second LC accommodation bottle, and the third LC accommodation bottle is for production, and the other two are for backup.

7. The LC pump according to claim 4, wherein the at least one nozzle comprises at least two nozzles, and each of the at least two nozzles is connected with the first outlet channel.

8. The LC pump according to claim 7, further comprising: at least two second outlet channels corresponding to the at least two nozzles in a one-to-one correspondence manner; and wherein one end of each of the at least two second outlet channels is connected with the corresponding nozzle, and the other end of each of the second outlet channels is connected with the first outlet channel via a bypass channel.

9. A method for ejecting liquid crystal (LC) with a LC pump according to claim 1, wherein the LC pump further comprises: a piston arranged to extend in an axial direction within the LC delivery channel, wherein a piston opening is provided on the piston; the piston is movable in the axial direction of the LC delivery channel; and the piston opening is rotatable around an axis of the LC delivery channel as the piston moves,
the method comprising the following steps:
aligning the piston opening with one of the at least three LC inlets by rotating the piston around the axis of the LC delivery channel, so as to enable the LC to flow into the LC delivery channel from the at least three LC inlets as the piston moves upwards;
ejecting the LC from the LC delivery channel via the at least one nozzle, as the piston rotates around the axis of the LC delivery channel and moves downwards; and continuing to rotate the piston, so as to repeat the above two steps of aligning and ejecting.

10. The method according to claim 9, wherein
one end of each of the at least three inlet channels is connected with the corresponding LC inlet, and the other end of each of the at least three inlet channels is connected with the LC delivery channel.

11. The method according to claim 10, wherein the at least one nozzle is connected with the LC delivery channel via the first outlet channel.

12. The method according to claim 11, wherein
the at least three inlet channels and the first outlet channel are provided along a circumference of the LC delivery channel evenly.

13. The method according to claim 9, wherein with respect to the first LC inlet,
the piston opening is aligned with the first LC inlet and moves upwards;
the piston rotates by 90 degrees in a clockwise direction, such that the piston moves downwards after the piston opening is aligned with the first outlet channel; and
the piston rotates by 90 degrees in a counterclockwise direction to go back to its original position.

14. The method according to claim 9, wherein with respect to the second LC inlet, the piston opening is aligned with the second LC inlet and moves upwards; the piston rotates by 180 degrees in a clockwise direction, such that the piston moves downwards after the piston opening is aligned with the first outlet channel; and the piston rotates by 180 degrees in a counterclockwise direction to go back to its original position.

15. The method according to claim 9, wherein with respect to the third LC inlet, the piston opening is aligned with the third LC inlet and moves upwards; the piston rotates by 90 degrees in a counterclockwise direction, such that the piston moves downwards after the piston opening is aligned with the first outlet channel; and the piston rotates by 90 degrees in a clockwise direction to go back to its original position.

16. The LC pump according to claim 1, wherein the first inlet channel, the second inlet channel, the third inlet channel and the first outlet channel are provided along a circumference of the LC delivery channel.

17. A liquid crystal display (LCD) panel, comprising liquid crystal coated thereon by the method according to claim 9.

* * * * *